United States Patent
Bos et al.

(10) Patent No.: US 7,253,912 B2
(45) Date of Patent: Aug. 7, 2007

(54) PROGRAMMING A PRINT ORDER

(75) Inventors: Maria Johanna Bos, Eindhoven (NL); Edward Constantijn Bosma, Venlo (NL); Bastiaan Jeroen Hermus, Venray (NL)

(73) Assignee: OCE-Technologies B.V, Venlo (NL)

( * ) Notice: Subject to any disclaimer, the term of this patent is extended or adjusted under 35 U.S.C. 154(b) by 987 days.

(21) Appl. No.: 10/438,003

(22) Filed: May 15, 2003

(65) Prior Publication Data

US 2003/0214671 A1  Nov. 20, 2003

(30) Foreign Application Priority Data

May 15, 2002  (NL) .................................... 1020605

(51) Int. Cl.
*G06K 15/00* (2006.01)
*G06F 3/12* (2006.01)

(52) U.S. Cl. ..................................... 358/1.14; 358/1.15

(58) Field of Classification Search .............. 358/1.14, 358/1.15, 1.2, 1.1, 1.6, 1.13, 1.16, 1.18; 709/103, 709/223, 224, 228, 229, 232; 710/7, 8, 19, 710/46, 47

See application file for complete search history.

(56) References Cited

U.S. PATENT DOCUMENTS

| 5,113,222 | A | 5/1992 | Wilson et al. |
| 5,124,731 | A | 6/1992 | Knodt et al. |
| 5,243,381 | A | 9/1993 | Hube |
| 5,617,215 | A | 4/1997 | Webster et al. |
| 6,825,950 | B1 * | 11/2004 | Inagaki ........................ 358/1.2 |
| 6,950,204 | B2 * | 9/2005 | Nozaki ....................... 358/1.15 |

FOREIGN PATENT DOCUMENTS

EP  0 479 494 A2  4/1992

* cited by examiner

*Primary Examiner*—Douglas Q. Tran
(74) *Attorney, Agent, or Firm*—Birch, Stewart, Kolasch & Birch, LLP

(57) ABSTRACT

In a printing system for documents, print orders are programmed by selecting image supports and settings for the printing process. Prior to programming a print order, settable process-directed properties can be assigned to a specific image support type by using an operating function. These properties may not be overridden in the programming of a print order. Example of such settable process-directed properties are: single-sided printing, and non-stapling.

38 Claims, 6 Drawing Sheets

PROGRAMMING A PRINT ORDER

The present application claims, under 35 U.S.C. § 119, the priority benefit of Dutch Patent Application No. 1020605 filed on May 15, 2002, the entire contents of which are herein fully incorporated by reference.

BACKGROUND OF THE INVENTION

1. Field of the Invention

This invention relates to a method of processing a print order in a system for printing digital documents, including a programming step for the print order, wherein image supports to be used for the print order and at least one setting for a printing process for the print order applicable to at least one image of the print order, are specified by using a first operating function; and a processing step in which the system automatically arranges the printing process as specified in the programming step and then accordingly prints digital images on the image supports. The invention also relates to a system for printing digital documents wherein the above method is applied, and a computer program which performs the steps of the invention when loaded into a computer.

2. Discussion of the Background Art

A general method and apparatus for processing a print order is known from U.S. Pat. No. 5,124,731, which describes a general digital copying machine/printer. For a print order, a type of image supports (e.g., paper sheets, transparencies) has to be selected from a set of image support types shown on the operator control unit display. Covers can also be added to the printed document. For the covers it must be indicated whether they are to be left blank or are to be printed on the front, back or both sides. This choice thus leads to a property which is coupled to the function called "covers" and which influences the printing procedure since digital images must be so displaced as to arrive on the correct image supports. Also, again a type of image supports has to be selected for the covers.

The disadvantage of this known method is that it is coupled to the function of the associated image supports and hence cannot take into account the specific properties of the material used in the image supports. For instance, assume that a document for printing is provided with a cover that must be printed on both sides. If the operator now selects a transparent image support type for the covers, the front and rear texts will both be visible. However, since the transparent image support type has been selected, the front and rear texts will be hardly legible. For another example, a deluxe paper with a special impression, which may be printed only on the front, may be used as the image support. Duplex printing on such a deluxe paper would then destroy the intended appearance of the printed matter and is therefore undesirable.

SUMMARY OF THE INVENTION

An object of the invention is to provide a method which prevents such unwanted effects of the conventional art and in a simple manner offers the facility of taking into account the specific properties of the image support materials used.

Another object of the invention is to provide a system, method and computer program for processing a print order, which overcome the problems and limitations of the conventional art.

According to one aspect of the invention, prior to, the processing of a print order a settable process-directed property is assigned to at least one first type of specifiable image supports by using a second operating function. In the programming step, a specification of settings for the printing process that conflicts with the process-directed property, is prohibited by a first operating function if the first type of image supports has been specified.

One example of application of the present invention is the prohibition of double sided printing for transparencies, in order to prevent printing of images on both sides of the image support which renders one another illegible. Another example is the prohibition of stapling, for example, if the image support in question is subsequently to be removed from the pack of image supports. If the image support type selected for that image support is coupled to the "No stapling" property, then this automatically prevents stapling of a set of image supports of which this special image support forms part.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described with reference to non-limiting exemplified embodiments relating to the accompanying drawings wherein.

DETAILED DESCRIPTION OF THE PREFERRED EMBODIMENTS

Figure 1:
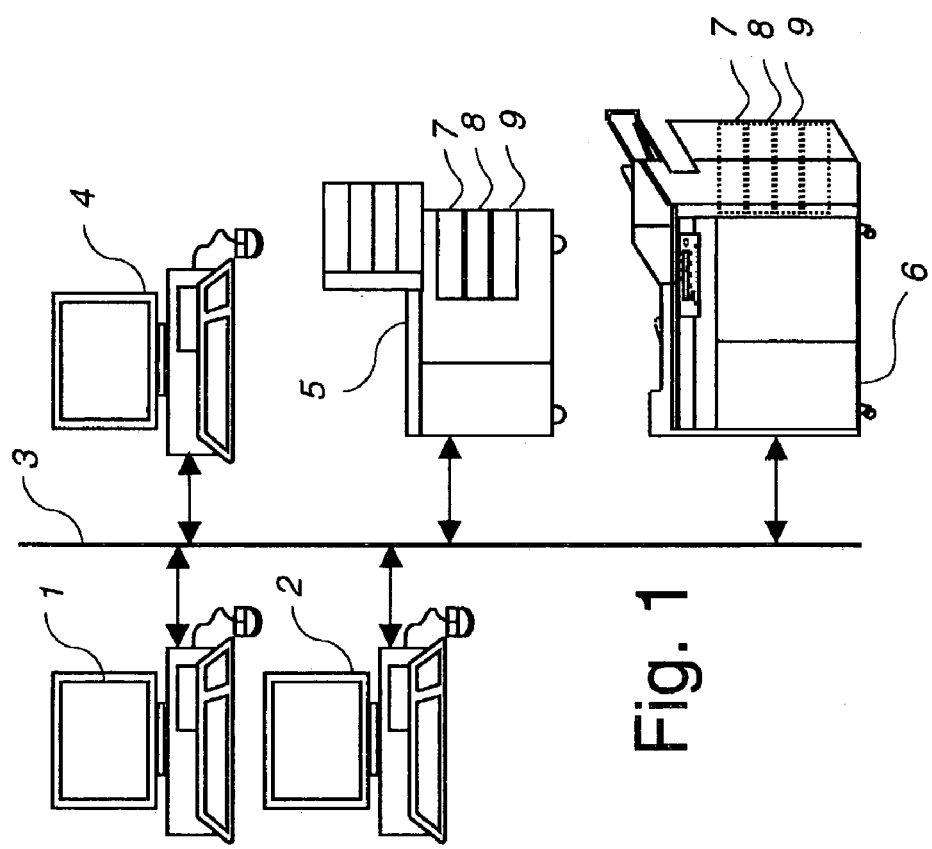
FIG. 1 is a first embodiment of a system for printing digital documents according to the present invention.

FIG. 1 illustrates one embodiment of a system for printing digital documents according to the invention. As shown, a number of workstations 1, 2 are coupled, via a data network 3, to a print server 4 (e.g., a suitably programmed PC), all operatively coupled. The print server 4 receives print orders from the workstations, pre-processes them if necessary, and passes them on to one of the printers 5, 6 which are also operatively coupled. The printers have stocks 7, 8, 9 of different types of image supports, usually sheets of paper or other material, such as overhead sheets, transparencies, photo sheets, tabbed sheets, hole-punched sheets, etc., from which a choice can be made for a print job.

In accordance with an embodiment of the present invention, a print order contains a digital document. In addition to digital data which determine the content of the document, the print order can also contain data which specify the appearance of the finally printed document, such as the image supports to be used, for example, sheets of paper of a specific size and color, simplex or duplex printing, finishing by stapling, gluing, etc.

In some cases, the data specifying the appearance of the finally printed document, however, may be incomplete or even absent. In that case, the system, e.g., the print server or the printer controller, fills in default values for the absent settings. It may also happen that the owner of the digital document wants special settings for the printing process which he cannot or does not wish to specify with the printer driver in his workstation. He can then make his wishes known, for example verbally, to the print server operator, usually situated in a central repro-department, who then finally specifies the finish, for example by means of a page programming function in the print server (for example, by choosing for the entire printed document or part thereof one specific image support to be used from a set of possible image support types). These support types are characterised by physical properties such as size, color and/or material, and they may also have additional properties which can be set separately.

Figure 2:
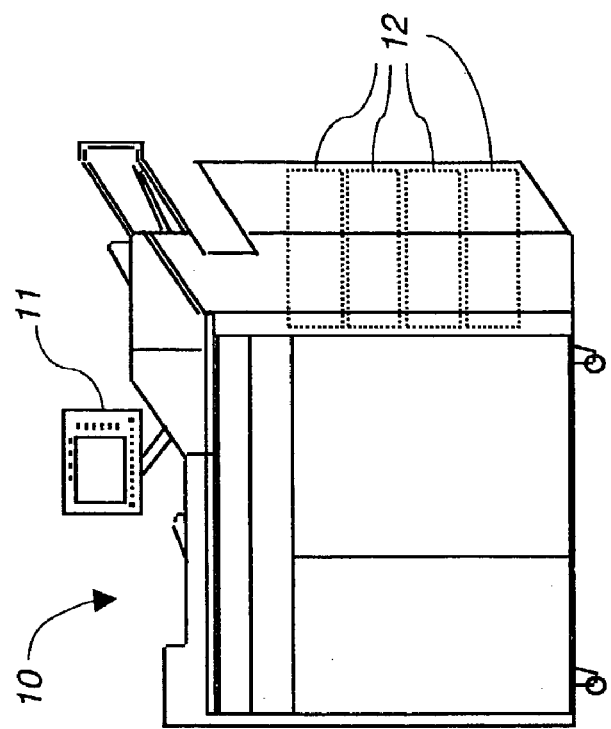
FIG. 2 is a second embodiment of a system for printing digital documents according to the present invention.

Another embodiment of the present invention is shown in FIG. 2. As shown in FIG. 2, it illustrates a copying machine 10 provided with an operator control unit 11, in which a choice can be made from a number of image support types situated in the various paper trays 12. The various types of image supports are characterised by physical properties such as size, color and/or material and may have additional properties which can be set by means of the operator control unit 11. The operator control unit 11 or other part of the machine 10 may also be equipped with a page programming function by which it is possible to make settings for each copy image. The copying machine 10 may be digital, i.e., a combination of a scanner and a printer, but it may also be an analogue machine, i.e., a machine which images an original document directly and prints it on copying sheets.

The following example relates to a situation in which digital images are copied, by means of the page programming function, on the sides of image supports which also have to be specified. The situation without page programming is similar but in that case the settings made generally always apply to the entire printed document. This example relates to a print order sent from a workstation to a central repro-department.

Figure 3:
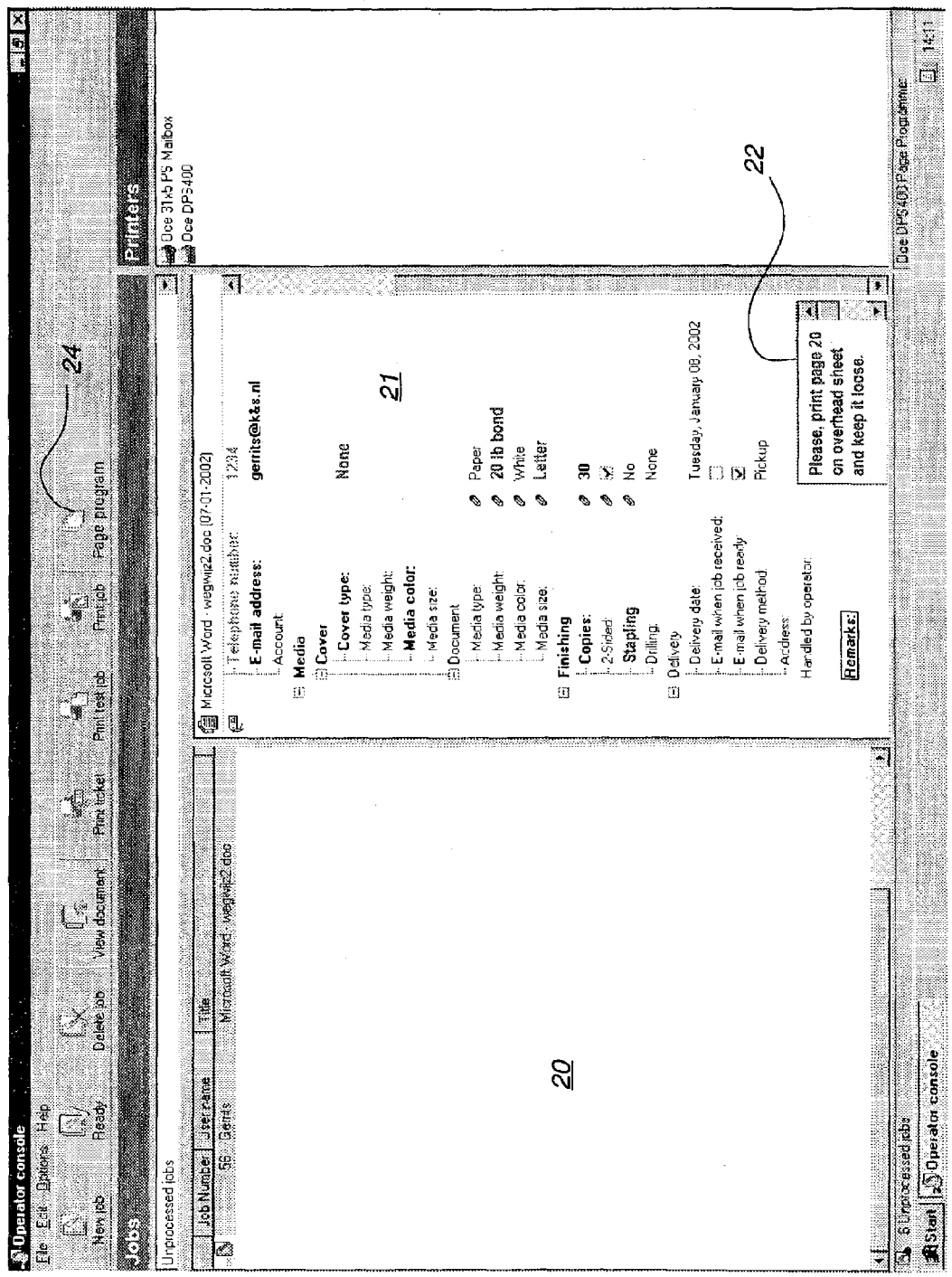
FIGS. 3 to 7 are examples of displays shown when using an exemplified embodiment of the invention.

FIG. 3 shows an example of an image shown on the display at the print server (such as the server 4 in FIG. 1) or operator control unit (such as the control unit 11 in FIG. 2), when the transmitted print order has been selected for further programming. As shown in FIG. 3, the left-hand window 20 shows the name of the job, while the right-hand window 21 gives data concerning the order as sent by the person giving the order. These data contain specifications for the required image supports, the required finish and a number of management data for transacting the order. There is also a messaging window 22 for any special notes from the person giving the order.

Figure 4:
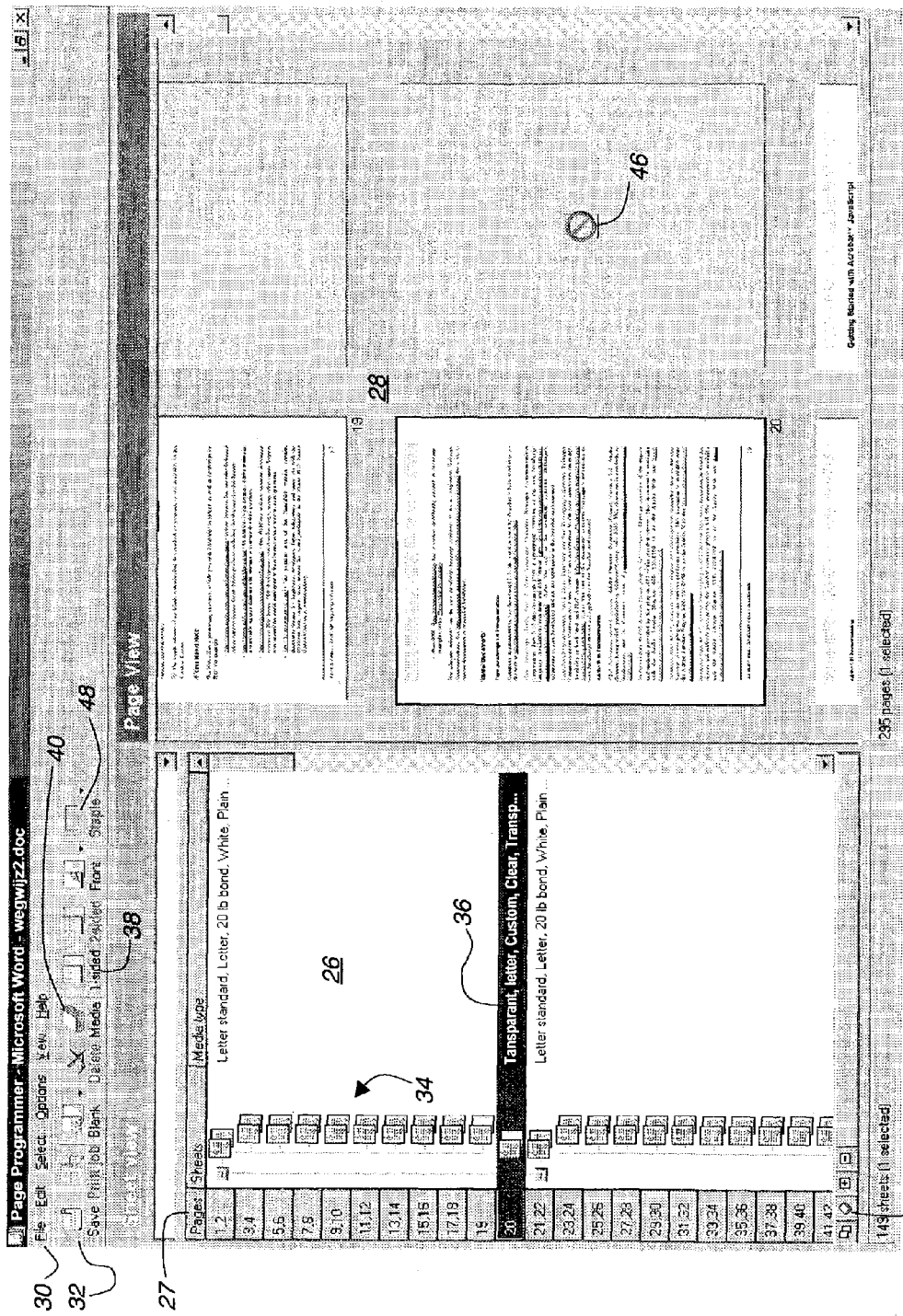

In accordance with an embodiment of the present invention, by clicking the "Page program" button 24 in the tool bar at the top of the image, it is possible to switch on the page programming function. A new image then appears on the display at the print server or operator control unit, as is shown in FIG. 4. This image comprises a first window 26, a second window 28, a menu bar 30 and a tool bar 32.

The first window 26, the "Sheet view" window, illustrates the image supports in icon form (34), either separately under one another or as groups as selected by the operator (this is operated by using the + and − keys known from Windows®). The "Pages" column 27 on the left of the first window 26 contains the page numbers of the images printed on the respective image supports. Then icon 34 shows the front and reverse of the image support partially superimposed, with symbolic images thereon. Simplex or duplex printing can be read off from this. If a particular color is selected for the image support, then a separate icon in the selected color of the image support may be shown or the color of the icon 34 may depict the selected color of the image support. In the second window 28, the "Page view" window, the same image supports with the actual images applied thereto are shown naturally on a somewhat larger scale with an image support 36 selected in the first window 26 in the focus. The tool bar 32 contains buttons for the most usual functionality in the programming process.

A number of option keys are provided at the bottom left of the image, of which the "Media view" button 33 is noted here. An overview of the image support types used can be shown in the first window 26 by means of this button. This will be explained hereinafter.

For each image it is possible to select settings relating to the printing result, such as the size and the color of the image support on which it is printed and the simplex or duplex setting. A choice of this kind is made by selecting an image in the first or second window 26,28 and then combining it with a setting, for example by clicking on the "Onesided" button 38 in the tool bar 32. The selection is displayed in the first and/or second window 26,28. For example, the selected color is also shown in reality and a simplex print is shown by showing the reverse of the sheet as blank in the icon 34 of the first window 26 or in the second window 28.

A change of setting may influence the image support arrangement. For example, if image number 32 (number in the column 27) in FIG. 4 is set to "Color of image support: red", then that image would be removed from the back of the current image support (which is white) and be placed on the front of a following red image support inserted for the purpose. If image number 11 in the column 27 of FIG. 4 were to be redefined as "Simplex", then image number 12 would be removed from the back of that image support and placed on the front of the next image support and the images number 13 to number 19 following thereon would be shifted accordingly.

Selecting an image in the first window 26 is effected by clicking on the corresponding image support with a mouse or other element having a similar function. The image or images on that image support are then selected. An individual image can be selected in the second window 28, since the images on the front and reverse side of an image support are separately displayed therein. Groups of images can also be selected, both in the first and second windows 26,28.

Figure 5:
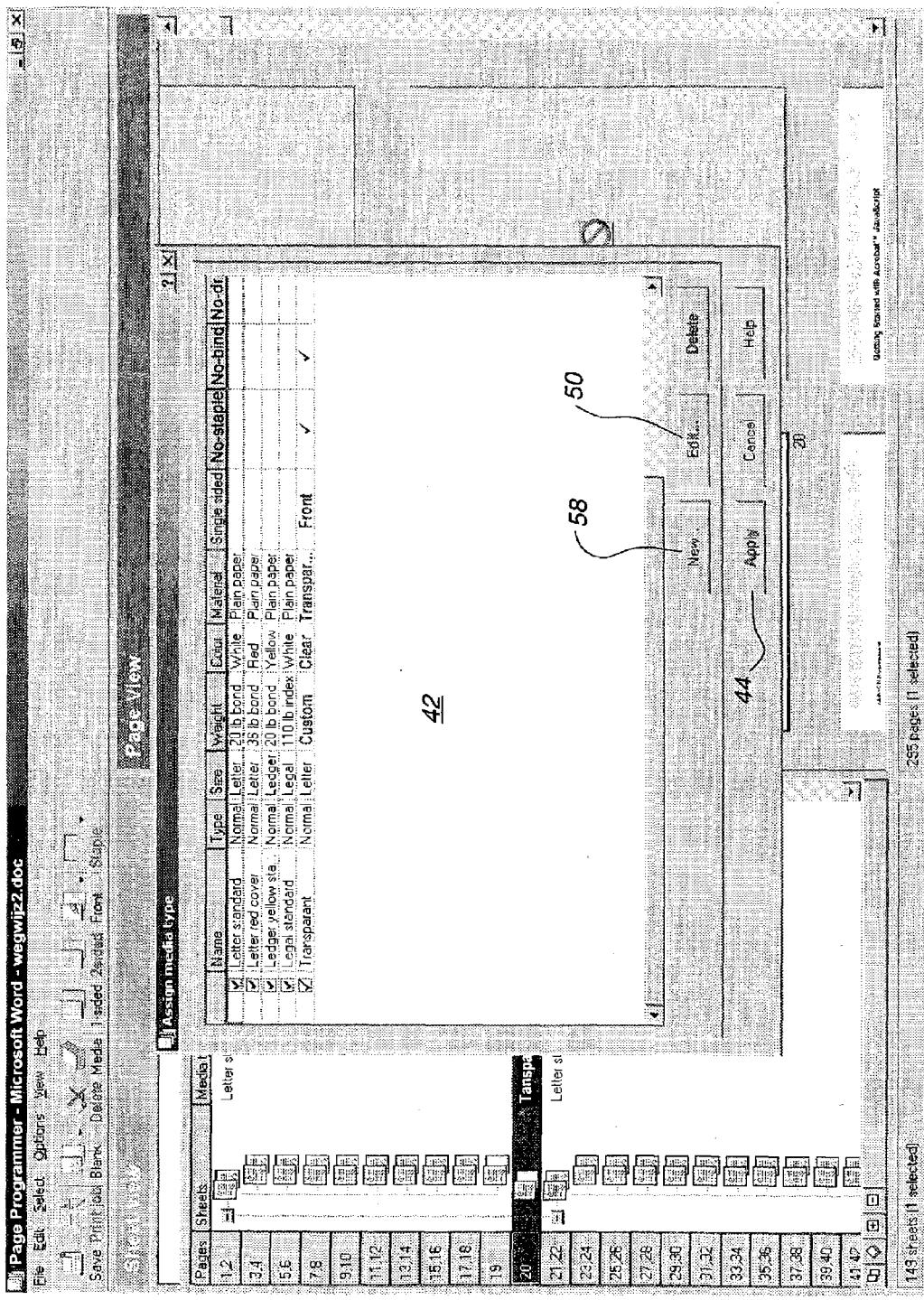

Properties of the image supports are selected by clicking the "Media" button 40 on the tool bar 32 for a selected image or group of images. In response to this selection, a menu window 42 opens with a list of predefined types of image supports, properties such as size, material and color being listed for each type of image support. An example of this is shown in FIG. 5. Obviously, other examples are possible. In this option window 42 the operator can select one of the media (image support) types by appropriately clicking thereon and then clicking the "Apply" button 44, so that the selected image support type is assigned to the image. Alternatively, of course, it is possible not to offer predefined image support types for selection, but instead a number of image support properties for which values should be selected.

The image support properties also include the settable process-directed properties: "printable on one side" ("Single sided"), further specified as "Front only" or "Rear only", "No staple", "No binding" and "No drilling". These process-directed properties are termed settable because they are not determined by physical limitations of the image supports, such as the dimensions, transparencies or thickness for example, or of the production process, but are specified by the operator as an outline condition of the production process. In accordance with an embodiment of the present invention, an outline condition of this kind has the highest level in programming and may not therefore be overruled by a setting in the page programming (discussed hereinbefore).

The property "Single sided" imposes on the production process the precondition that image supports of this type may never be printed on two sides. This is, for example, logical for overhead sheets. In the second window ("Page view") 28, this is made clear to the operator by a prohibition icon 46 (FIG. 4) on the blank back side of the image support. If the operator were nevertheless to choose duplex printing for this image in the page programming, the system would refuse it and show a message on the monitor to explain the reason for the refusal.

The properties "No staple", "No binding" and "No drilling" are self-explanatory. They impose on the system the precondition that a set of prints to which they belong is not to be subjected to the finishing operation such as stapling, binding, drilling, etc. If the operator were nevertheless to select, e.g., "Stapling" for such a set, the system would make known by a message on the display of the print server or operator control unit that this setting is prohibited and why. If necessary, the system can also give advice as to an alternative solution, for example in this case splitting the print order into separate parts.

The "Stapling" setting can be made in the page programming function for a sub-set of the images (and hence the associated image supports) by first selecting a number of consecutive images in one of the two windows 26, 28 and then clicking on the "Staple" button 48 in the tool bar 32. On the other hand, this setting and also the typical finishing operations of "Binding" and "Drilling" can also be made for the entire printed document outside the page programming function. The latter is left by clicking "File" and then "Exit" in the menu bar 30. The window then re-opens with the general settings of the print order shown in FIG. 3. The required finishing operations can be specified therein.

Figure 6:
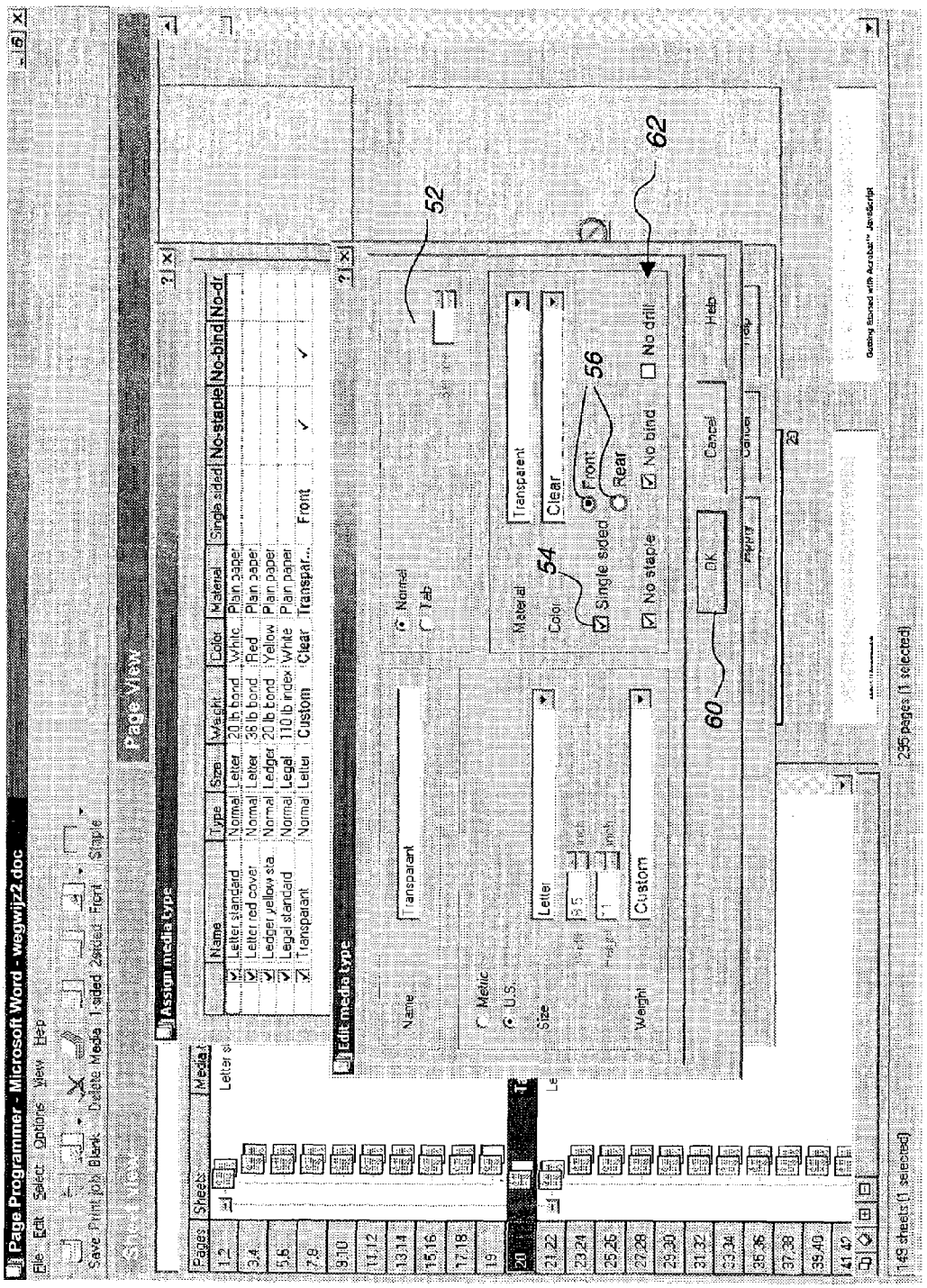

The properties of a pre-defined image support type can be adapted by clicking the "Edit" button 50 (FIG. 5) for a selected type in the option window 42. A specification window 52 as shown in FIG. 6 then opens, in which it is possible to select properties and settings for the image support types. Here the process-directed properties can be set by clicking on the corresponding tick boxes. The "Single sided" tick box 54 activates the radio buttons "Front" and "Rear" 56 for a further specification of this property. Also shown in this example are tick boxes 62 for the selection of "No staple", "No binding" and/or "No drilling" properties.

A new image support type can also be pre-defined by clicking on the "New . . . " button 58 in the selection window 42 of FIG. 5. The same specification window 52 as shown in FIG. 6 then opens. After the settings have been chosen, the operator can click on button "OK" 60 and then the new image support type is automatically added to the list in the option window 42 in FIG. 5.

It should be noted here that in the final printing process in a printer, the various image support types do not necessarily need to coincide with different physical stocks in the printer or copying machine. It is possible that two types are in reality physically entirely identical and obtained from the same stock, but these types may differ in that no process-limiting property is assigned to the first type and such a property is assigned to the second type. As a result, the corresponding precondition can be imposed on the process by selecting the second type of image supports while if the first type of image supports is selected the process is not subject to that precondition.

The settable process-directed properties enumerated in this example are intended only as an example. It will be clear to the skilled person that other properties can be applied. An additional example is "No folding".

Figure 7:
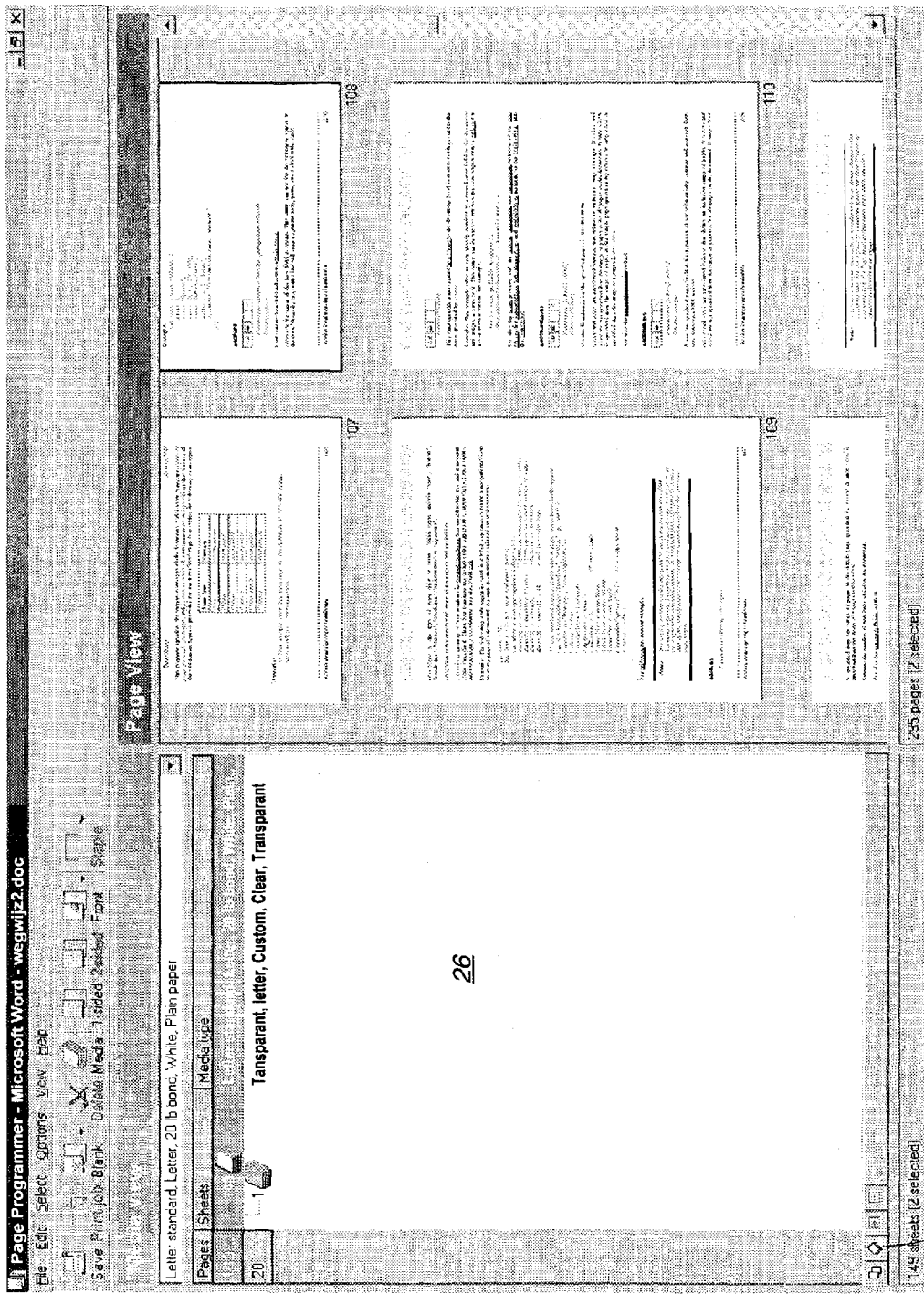

FIG. 7 shows an example of a monitor display given when the "Media view" button 33 is clicked in the image of FIG. 4. The first window 26 then gives an overview of the different image support types used in the print order, in this case the types "Letter standard" and "Transparent" are shown. The number of each type is indicated, i.e. 148 and 1 respectively here. This overview is convenient to the printer operator executing the order in order to see what types of image supports must be loaded in the stock trays.

The present invention including, but not limited to, the generation and functional operations of the display images and their interrelations as shown in FIGS. 3-7 and discussed above, is implementable using computer software writable in any existing computer programming language. Such computer program(s) entirely or in part may be stored in memories such as RAM, ROM, PROM, etc. associated with workstations, print servers, printers, and/or copying machines of a system for printing digital documents. Alternatively, such computer program(s) entirely or in part may be stored in a storage medium such as a magnetic disc, optical disc, magneto-optical disc, etc. Such computer program(s) entirely or in part may also take the form of a signal propagating across the Internet, extranet, intranet or other network and arriving at the destination device for storage and implementation. These computer programs are readable by any computer means.

Although the invention has been explained by reference to the above-described exemplified embodiment it is not limited thereto. It will be immediately clear to the skilled person that other embodiments of the invention are possible within the scope of the following claims. For example, the invention can be applied in any system for making images on image supports, such as printers, digital and analogue copiers, in which a choice can be made of image support types, either from a list of pre-defined image supports or by successively specifying the properties of the required image supports. In the latter case, the settable process-limiting properties can automatically be added to a pre-defined combination of properties.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of processing a print order in a system for printing digital documents, the method comprising:
   a programming step for the print order, wherein image supports to be used for the print order and at least one setting for a printing process for the print order applicable to at least a number of images of the print order, are specified by using a first operating function; and
   a processing step in which the system automatically arranges the printing process as specified in the programming step and then accordingly prints digital images on the image supports,
   wherein prior to the programming of a print order, a settable process-directed property is assigned to at least one first type of specifiable image supports by using a second operating function, and
   in the programming step, a specification of settings for the printing process that conflicts with said process-directed property is prohibited by the first operating function if said first type of image supports has been specified.

2. A method according to claim 1, wherein, in the programming step, the step of specifying image supports includes:
allocating a type of image support selected from a number of preprogrammed types of image supports, each type associated with specific properties including, for at least one type of image support, said settable process-directed property.

3. A method according to claim 1, wherein the prohibition of a specification of a setting is substantiated by making the prohibited setting unselectable.

4. A method according to claim 1, wherein the prohibition of a specification of a setting is substantiated by refusing the prohibited setting and displaying a message indicating the refusal by using the first operating function.

5. A method according to claim 1, further comprising:
specifying image supports to be used for the print order;
specifying a correspondence between images of the print order and sides of the image supports;
automatically coupling the images of the print order to the sides of image supports as specified and accordingly printing digital images on the specified image supports, wherein a settable process-directed property with respect to side occupation is previously assigned to at least one type of image supports; and
prohibiting a correspondence specification which is in conflict with said settable process-directed property.

6. A method according to claim 3, wherein the content of the settable process-directed property is that said type of image supports is printable on only one side.

7. A method according to claim 3, wherein the content of the settable process-directed property is that said type of image supports is printable on only the front side.

8. A method according to claim 3, wherein the content of the settable process-directed property is that said type of image supports is printable on only the rear side.

9. A method according to claim 1, further comprising:
specifying image supports to be used for the print order;
specifying a setting containing a finishing parameter for all or some of the image supports after printing the digital images;
automatically finishing as specified, of the image supports after printing, wherein a settable process-directed property with respect to finishing is previously assigned to at least one type of image supports; and
prohibiting a finishing specification which is in conflict with said settable process-directed property, for that part of the image supports for which said setting was specified, if at least one image support of the first type is situated in that part.

10. A method according to claim 9, wherein said settable process-directed property contains a prohibition of stapling.

11. A method according to claim 9, wherein said settable process-directed property contains a prohibition of drilling.

12. A method according to claim 1, wherein the first and second operating functions are the same.

13. A method according to claim 1, wherein the system is formed by a print server with its own operating function and a printer coupled to the print server.

14. A method according to claim 1, wherein in the programming step, a possible settable process-directed property of one type of image supports is displayed to an operator during the making of settings for the print order.

15. A method according to claim 1, further comprising:
coupling, under the control of an operator, the digital images of the print order to image supports by using a graphic page programming function in the first operating function.

16. A method according to claim 15, wherein image supports with said settable process-directed property are displayed in an overview image of the graphic page programming function.

17. A method according to claim 1, further comprising:
making a digital document for printing by scanning a physical image support by using an electro-optical scanner, so as to provide the print order.

18. A system for printing digital documents, the system comprising:
a first operator control unit for programming a print order, arranged for specifying image supports to be used for the print order and for specifying at least one setting for a printing process for the print order, applicable to at least a number of images of the print order;
a second operator control unit for, prior to the programming of the print order, assigning a settable process-directed property to at least one first type of specifiable image supports;
a control unit for automatically arranging the printing process as specified in the first operator control unit; and
a printing unit for performing the printing process for digital images on the image supports as arranged by the control unit,
wherein the first operator control unit prohibits a specification of settings for the printing process which is in conflict with said process-directed property, said prohibition relating to said first type of image supports.

19. A system according to claim 18, wherein the first operator control unit offers a choice of a number of preprogrammed types of image supports, each type associated with specific properties including said settable process-directed property for at least one type of image supports.

20. A system according to claim 18, wherein the first operator control unit prohibits a specification of a setting by making the prohibited setting unselectable.

21. A system according to claim 18, wherein the first operator control unit prohibits a specification of a setting by refusing the prohibited setting and displaying a message indicating the refusal.

22. A system according to claim 18, wherein the first operator control unit provides a possibility of:
specifying image supports to be used for the print order, and
specifying a correspondence between images of the print order and sides of the image supports; and
wherein the control unit is arranged for coupling the images of the print order to the sides of image supports as specified, in that the second operator control unit offers the possibility of assigning a settable process-directed property with respect to side occupation to at least one type of image supports, and the first operator control unit prohibits a correspondence specification which is in conflict with said settable process-directed property.

23. A system according to claim 22, wherein the content of the settable process-directed property is that said type of image supports is printable on only one side.

24. A system according to claim 22, wherein the content of the settable process-directed property is that said type of image supports is printable on only the front side.

25. A system according to claim 22, wherein the content of the settable process-directed property is that said type of image supports is printable on only the rear side.

26. A system according to claim 18, wherein the first operator control unit provides a possibility of specifying image supports to be used for the print order and specifying a setting including a finishing parameter for the entire order or a part of the image supports after printing with digital images;
the control unit is arranged for the automatic finishing as specified, of the image supports after printing;
the second operator control unit offers the possibility of assigning a settable process-directed property in respect of finishing to at least one first type of image supports; and
the first operator control unit prohibits a finishing specification which is in conflict with said settable process-directed property, for that part of the image supports for which said setting was specified, when said part contains at least one image support of the first type.

27. A system according to claim 26, wherein said settable process-directed property contains a prohibition of stapling.

28. A system according to claim 26, wherein said settable process-directed property contains a prohibition of drilling.

29. A system according to claim 18, wherein the first and second operating units are the same.

30. A system according to claim 18, wherein the system is formed by a print server with its own operating function and a printer coupled thereto.

31. A system according to claim 18, wherein the system is formed by a printer with its own operating function.

32. A system according to claim 18, wherein the first operator control unit displays a possible settable process-directed property of one type of image supports to an operator during the making of settings for the print order.

33. A system according to claim 18, wherein the first operator control unit is provided with a graphic page programming function for coupling the digital images of the print order to image supports under the control of an operator.

34. A system according to claim 33, wherein the first operator control unit controls to display page supports with said settable process-directed property on a display in an overview image of the graphic page programming function.

35. A system according to claim 18, further comprising:
an electro-optical scanner for making a digital document by scanning a physical image support.

36. A computer program product embodied on at least one computer readable medium, for processing a print order in a system for printing digital documents, the computer program product comprising computer-executable instructions for:
a programming step for the print order, wherein image supports to be used for the print order and at least one setting for a printing process for the print order applicable to at least a number of images of the print order, are specified by using a first operating function; and
a processing step in which the system automatically arranges the printing process as specified in the programming step and then accordingly prints digital images on the image supports,
wherein prior to the programming of a print order, a settable process-directed property is assigned to at least one first type of specifiable image supports by using a second operating function, and
in the programming step, a specification of settings for the printing process that conflicts with said process-directed property is prohibited by the first operating function if said first type of image supports has been specified.

37. A computer program product according to claim 36, wherein the computer readable medium is in the form of a signal propagating across a network.

38. A computer program product according to claim 36, wherein the computer-readable medium includes at least one of the following:
a memory associated with a computer, and
a storage disk.

* * * * *